S. D. SPRONG.
REACTANCE COIL.
APPLICATION FILED MAR. 22, 1918.
1,314,373.
Patented Aug. 26, 1919.
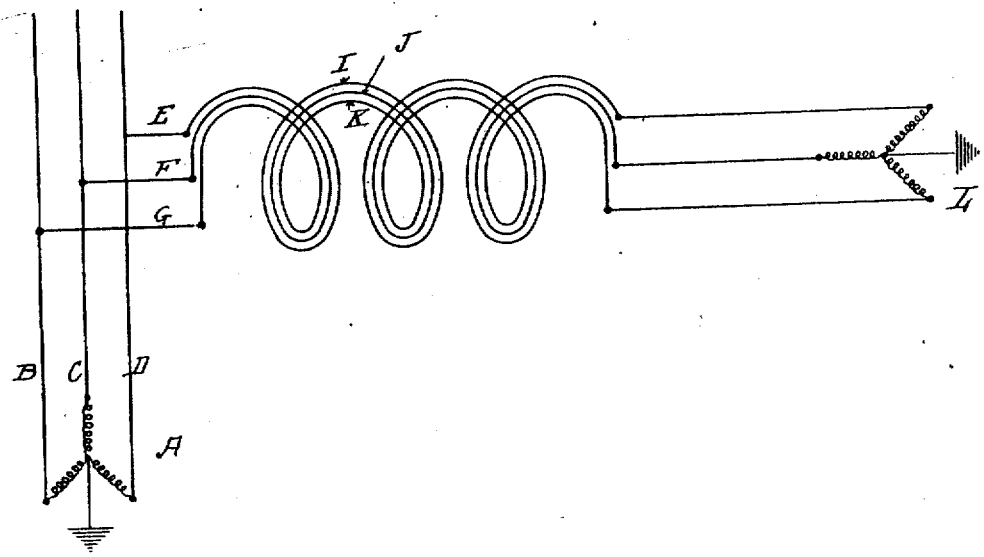
INVENTOR
Severn D. Sprong
BY
his ATTORNEY

UNITED STATES PATENT OFFICE.

SEVERN D. SPRONG, OF BROOKLYN, NEW YORK.

REACTANCE-COIL.

1,314,373.   Specification of Letters Patent.   Patented Aug. 26, 1919.

Application filed March 22, 1918. Serial No. 223,906.

*To all whom it may concern:*

Be it known that I, SEVERN D. SPRONG, a citizen of the United States, residing at Brooklyn, in the county of Kings and State of New York, have invented a certain new and useful Improvement in Reactance-Coils, of which the following is a specification.

The invention is a balanced three-phase reactance.

With the present large aggregations of generating capacity, it is becoming the practice to install reactance in the individual leads of the generators between generator and bus for the purpose of limiting the current in cases of short circuit. Reactance is also being used in the individual phases of outgoing feeders for the similar purpose of limiting the excess current in case of short circuit on the feeder. The general plan is to introduce an air core reactance in each of the several legs of the polyphase generator or feeder. The result of this arrangement is the permanent installation in the circuit of a fixed reactance, the reactive voltage being, of course, proportional to the current load. This is objectionable in that it introduces an element which, in the case of the generators, causes a lowering of the power factor by the lagging current and in turn requiring greater excitation to overcome it. In the case of feeders, it introduces a reactance that effects the regulation of the feeder, and causes an artificial voltage drop between terminals.

My present invention consists in introducing reactances in each phase, so that they will be mutually inductive. Under balanced loads, which is the usual condition, these will neutralize the inductive drop, each of the other; so that in event of abnormal load due to trouble in one phase, they will become active and perform the desired result, as hereinafter explained.

The accompanying drawing shows my invention in electrical diagram.

A is the generator, supplying phase current to the bus-bars B, C, D, to which are connected the feeders E, F, G, grounded at L. In each feeder is a reactance I, J, K, the windings of said reactances being disposed, as indicated, in inductive relation.

A particular application of this invention in the present state of the art is in cases of transmission systems that are operated with the neutral point of the Y connection grounded. When so grounded, an insulation breakdown on the line nearly always occurs between an individual phase and ground, in which case there is usually no spreading of trouble to adjacent phases, and such ground results in immediately operating the protective devices due either to the excess current or unbalance of the phases.

Assuming the connection in the feeder circuit of a set of balanced reactances, as described, it is obvious that a ground on one phase resulting in excess current from that phase would immediately introduce the artificial reactance intended due to the unbalancing of the currents in the mutually related reactances, therefore, the phase having the greater current would have a proportional counter-reactance voltage set up in it which would limit the current between that particular phase and ground.

I claim:

1. In combination with a polyphase circuit, a reactance in each phase, the said reactances being disposed in mutually inductive relation and under normal conditions being substantially balanced to neutralize one another and under abnormal conditions due to short circuit of one phase becoming unbalanced and operating to limit the extent of disturbance due to said short circuit.

2. In combination with the leads of a polyphase circuit, a reactance in each phase, said reactances having windings disposed in mutually inductive relation and under normal conditions being substantially balanced to neutralize one another and under abnormal conditions due to short circuit of one phase becoming unbalanced and operating to limit the extent of disturbance due to said short circuit.

In testimony whereof I have affixed my signature in presence of two witnesses.

SEVERN D. SPRONG.

Witnesses:
GERTRUDE T. PORTER,
MAY T. MCGARRY.